United States Patent
Huebner et al.

(10) Patent No.: US 8,642,669 B2
(45) Date of Patent: Feb. 4, 2014

(54) FOAMABLE LOW-VISCOSITY MIXTURES

(75) Inventors: Wilfried Huebner, Langenfeld (DE); Milan Sebestian, Grevenbroich (DE); Christiane Kunze, Cologne (DE); Lars Zander, Rommerskirchen (DE); Johann Klein, Duesseldorf (DE)

(73) Assignee: Henkel AG & Co., KGaA, Duesseldorf (DE)

( * ) Notice: Subject to any disclaimer, the term of this patent is extended or adjusted under 35 U.S.C. 154(b) by 0 days.

(21) Appl. No.: 13/010,344

(22) Filed: Jan. 20, 2011

(65) Prior Publication Data

US 2011/0224319 A1    Sep. 15, 2011

Related U.S. Application Data

(63) Continuation of application No. PCT/EP2009/059443, filed on Jul. 22, 2009.

(30) Foreign Application Priority Data

Jul. 22, 2008  (DE) .......................... 10 2008 034 272
Jun. 30, 2009  (DE) .......................... 10 2009 027 332

(51) Int. Cl.
   *C08G 77/04* (2006.01)
(52) U.S. Cl.
   USPC ........... 521/154; 521/107; 521/108; 521/114; 521/117; 521/123; 521/124; 521/128; 521/131; 521/170; 222/635
(58) Field of Classification Search
   USPC ......... 521/107, 108, 114, 117, 123, 124, 128, 521/131, 154, 170; 222/635
   See application file for complete search history.

(56) References Cited

U.S. PATENT DOCUMENTS

| 5,866,651 | A | 2/1999 | Moren et al. |
| 7,140,223 | B2 | 11/2006 | Chupak |
| 8,114,233 | B2 | 2/2012 | Stanjek |
| 2005/0075469 | A1 | 4/2005 | Feng |
| 2005/0234144 | A1* | 10/2005 | Bachon et al. ............... 521/137 |
| 2009/0018228 | A1* | 1/2009 | Mager et al. ................. 521/154 |
| 2010/0305229 | A1* | 12/2010 | Ziche et al. .................. 521/154 |

FOREIGN PATENT DOCUMENTS

| CN | 1675010 | 9/2005 |
| DE | 102006054155 | 5/2008 |
| WO | 9606124 | 2/1996 |
| WO | 9638453 | 12/1996 |
| WO | 0004069 | 1/2000 |
| WO | 02066532 | 8/2002 |
| WO | 2004/046218 | * 6/2004 |
| WO | 2005049684 | 6/2005 |

OTHER PUBLICATIONS

International Search Report issued in connection with International Patent Application No. PCT/EP2009/059443 mailed Feb. 19, 2010.
DIN18159.
DIN 53018.
DIN 53019.
DIN/EN/ISO 2555.

* cited by examiner

*Primary Examiner* — John Cooney
(74) *Attorney, Agent, or Firm* — James E. Piotrowski; Steven C. Bauman

(57) ABSTRACT

The invention relates to a foamable mixture which contains at least one alkoxysilane-terminated prepolymer and which can be produced of a) at least one alkoxysilane that was functionalized with isocyanate groups and that can be produced of at least one hydroxyfunctional and/or aminofunctional alkoxysilane and at least one diisocyanate or polyisocyanate, and b) at least one compound that contains at least one OH group, and at least one blowing agent, characterized in that the foamable mixture has a dynamic viscosity of 100 to 25,000 mPas, preferably 500 to 10,000 mPas, at 23° C. The invention further relates to a method for producing said foamable mixture. The foamable mixtures according to the invention are suitable for sealing, insulating and mounting joints, roof surfaces, windows and doors or for filling hollow spaces.

13 Claims, No Drawings

FOAMABLE LOW-VISCOSITY MIXTURES

This application is a continuation of International Application No. PCT/EP2009/059443, filed Jul. 22, 2009 and published on Jan. 28, 2010 as WO 2010/010128, which claims the benefit of German Patent Application No. 102008034272.6 filed Jul. 22, 2008 and German Patent Application No. 102009027332.8 filed Jun. 30, 2009, the contents of each of which are incorporated herein by reference in their entirety.

The invention relates to foamable mixtures which can be further processed to foamed plastics.

Foamed plastics in the sense of this invention are produced from disposable pressurized containers at the site of their use, so they are also known as in-situ foam (DIN 18159). These are moisture-curing one-component systems in particular. The composition to be foamed is usually in disposable pressurized containers (aerosol cans). These sprayable foams are used especially in the field of construction for sealing, insulating and mounting joints, roof surfaces, windows and doors or for filling cavities, for example. As excellent insulating materials, they lead to a good thermal insulation in the foamed state. Additional fields of application include, among other things, the insulation of pipelines or filling of cavities with foam in industrial equipment and machines.

The main construction foams that have been used so far are polyurethane foams (PU foams), which in the uncrosslinked state consist of prepolymers having a high concentration of free isocyanate groups. These isocyanate groups are capable of entering into addition reactions with suitable reactants even at room temperature, so that curing of the spray foam is achieved after application. The foam structure is produced by incorporating a highly volatile blowing agent into the raw material, which is as yet uncrosslinked, and/or by carbon dioxide, the latter being formed by a reaction of the isocyanates with water. The foam is usually discharged from disposable pressurized containers (pressurized cans or aerosol cans) due to the inherent pressure of the blowing agent.

Alcohols having two or more OH groups—especially branched and unbranched polyols—or water may be used as reactants for the isocyanates. Water reacts with isocyanates with the release of carbon dioxide, as mentioned above, to form primary amines, which can then be added directly to another isocyanate group, which has not yet been consumed. This results in urethane units and/or urea units, which can form partially crystalline substructures in the cured material because of their high polarity and their ability to form hydrogen bridge bonds, thus yielding foams of a high hardness, compressive strength and tensile strength.

In addition to carbon dioxide, gases that can be condensed even at relatively low pressure and can thus be added to the prepolymer mixture in a liquid form without having to expose the spray cans to excessively high pressures are usually used as the blowing agents.

PU spray foams are thus produced as so-called one-component and two-component foams. The one-component foams cure exclusively due to the isocyanate-containing prepolymer mixture coming in contact with atmospheric humidity. Furthermore, foaming can be supported by the carbon dioxide released during the curing reaction of the one-component foams. The two-component foams contain an isocyanate component and a polyol component, which must be mixed together well immediately before foaming and which cure due to the reaction of the polyol with the isocyanates. The advantage of the two-component systems is an extremely short curing time of only a few minutes in some cases up to complete curing. However, they have the disadvantage that they require a pressurized can having a complex design with two chambers and furthermore are much less convenient to handle than the one-component systems.

Cured PU foams are characterized in particular by their excellent mechanical and thermal insulating properties. They also have a very good adhesion to a great many substrates that occur in the construction field and have almost unlimited stability under dry and UV-protected conditions. Other advantages include the toxicological safety of the cured foams as soon as all the isocyanate groups, in particular the monomeric isocyanates, have reacted completely. They cure in a very short period of time and are easy to handle. Because of these properties, PU foams have proven very successful in practice. The prepolymer mixtures that are based on polyisocyanates and polyols and are used in pressurized cans to produce foam usually also contain, in addition to relatively high-molecular polymers, polyisocyanate that has not reacted at all or has reacted only to form low-molecular prepolymers. These components of the prepolymer mixtures form the actual potential risk because of their greater volatility and are therefore undesirable because the isocyanates, in particular the monomeric isocyanates, can also manifest extremely irritating and toxic effects because of their high reactivity and their high vapor pressure.

The uncrosslinked spray foam compounds are thus not toxicologically safe until they have fully cured. In addition to direct contact of the prepolymer mixture with skin, possible formation of aerosol during the application of the foam or evaporation of low-molecular components, e.g., of monomeric isocyanates, is critical here. This results in the risk that toxicologically objectionable compounds may be absorbed through the respiratory air. Furthermore, isocyanates have a substantial allergenic and sensitizing potential and can trigger asthma attacks, among other things. These risks are further intensified by the fact that the PU spray foams are often used not by trained and skilled users but instead by handymen and do-it yourselfers, so that proper handling cannot always be assumed.

The amines, which can be formed due to a reaction of monomeric diisocyanates with an excess of water, are suspected of being carcinogens in many cases.

In addition to this potential risk, which should be classified as low, given proper handling, there is, however, an acceptance problem with many users which is exacerbated due to requirements for declaring such products as toxic and classification of empty or partially empty containers as special waste, which in some countries, such as Germany, must even be made available for recycling by means of a cost-intensive recycling system.

To overcome these disadvantages, there have already been descriptions of prepolymers for spray foams, which contain only very low concentrations of monomeric isocyanates or none at all, in WO 96/06124, among others. However, one disadvantage of such systems is that the prepolymers produced in this way still have reactive isocyanate groups, so that even though such PU spray foams would be classified as more favorable than traditional foams from a toxicological standpoint, they still are not safe. Such foam systems also do not offer a fully satisfactory solution to acceptance and waste problems.

WO 2000/04069 describes prepolymer blends for producing sealing and insulating foams, which contain a prepolymer component, a blowing gas component and the usual additives required to produce the foam. The prepolymer component should be a silane-terminated polyurethane prepolymer having at least two $Si(OR)_x(R)_{3-x}$ groups in the molecule, where R stands for an alkyl radical with 1 to 6 carbon atoms and x is an integer from 1 to 3. Such prepolymer components often have a very high viscosity of more than 1,000,000 mPas and cause considerable problems in canned foam production, which is why they must often be filled at high temperatures. The miscibility of the viscous prepolymers with the other components is also unsatisfactory. Such foamable mixtures are therefore difficult to handle in the processes of manufacturing and filling the pressurized cans.

WO 2002/066532 discloses isocyanate-free foamable mixtures containing isocyanate-free alkoxysilane-terminated prepolymers and blowing agents, where the prepolymers have silane terminations of the general formula

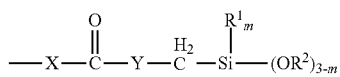

In this formula, X and Y stand for an oxygen atom, an N—$R^3$ group or a sulfur atom, $R^1$ is an alkyl, alkenyl or aryl radical with 1 to 10 carbon atoms, $R^2$ is an alkyl radical with 1 to 2 carbon atoms or an oxaalkylalkyl radical with a total of 2 to 10 carbon atoms, $R^3$ is a hydrogen atom, an alkyl, cycloalkyl, alkenyl or aryl radical with 1 to 10 carbon atoms or a $CH_2$—$SiR^1_m(OR^2)_{3-m}$ group, z may have values of 0 or 1, and at least one of the two groups X or Y should be an NH function. These prepolymers also have a very high viscosity at room temperature.

WO 2005/049684 relates to a polyurethanes or polyureas which have silyl groups and NCO groups and is synthesizable by using asymmetrical diisocyanates and substituted alkoxyaminosilanes. Furthermore, preparations and their use as surface coating agents, adhesives, construction foams, casting compounds as well as soft, hard or integral foams are described. These prepolymers are described as having a medium to high viscosity.

WO-A-96/38453 describes moisture-curing alkoxysilane-functional polyurethanes prepared from a hydroxy-functional alkoxysilane in particular a hydroxyalkylene carbamoylalkylene alkoxysilane and an isocyanato-functional polyurethane prepolymer. According to the teaching of this document, the alkoxysilane-functional polyurethanes may be used in moisture-curing adhesives, sealing compounds and similar preparations. Foamable compositions are not described.

Similarly, like the documents cited previously, U.S. Pat. No. 5,866,651 A describes moisture-curing sealing compounds based on polyether urethanes produced from hydroxyalkylene carbamoylalkylene alkoxysilanes. According to the teaching of this document, the polyether segments should have more than 15 mol % and less than 40 mol % ethylene oxide units, where the polyether segments should have a number-average molecular weight between 2000 and 8000, such that the ethylene oxide units are preferably arranged on the ends of the propylene oxide units. No foamable compositions are described there.

The object of the present invention is therefore to provide foamable compositions which are easy to handle during production and finishing in disposable pressurized containers (pressurized cans or aerosol cans) even at low temperatures—room temperature and/or moderate heating—and which can be filled especially well into such pressurized containers. Furthermore, the compositions yield fine-celled foams having the lowest possible shrinkage tendency.

The invention is based on the finding that this object can be achieved by providing foamable compositions which have the lowest possible viscosity and optionally react to form the prepolymer only in the pressurized container.

The subject matter of the present invention is therefore a foamable mixture which contains at least one alkoxysilane-terminated prepolymer, synthesizable from
a) at least one isocyanato-functionalized alkoxysilane, synthesizable from at least one hydroxy- and/or amino-functional alkoxysilane and at least one di- or polyisocyanate and
b) at least one compound containing at least one OH group; and at least one blowing agent, and is characterized in that the foamable mixture has a dynamic viscosity of 100 to 25,000 mPas at 23° C. (measured after replacement of the blowing agent by a methylal/pentane mixture of the same weight in a weight ratio of 40:60; ARES rotary rheometer (from TA Instruments); 23° C., 30 Hz cone-plate (cone angle 0.5° C.)).

"Of the same weight" means that the blowing agent is replaced by a methylal/pentane mixture having the same weight as the blowing agent originally contained in the mixture. The dynamic viscosity of the mixture according to the invention is preferably 500-10,000 mPas.

The solution to this problem thus consists essentially of providing a foamable mixture containing at least one alkoxysilane-terminated prepolymer which can optionally be synthesized only in the pressurized container from a) at least one isocyanato-functionalized alkoxysilane, synthesizable from at least one hydroxy- and/or amino-functional alkoxysilane and at least one di- or polyisocyanate and b) at least one compound containing at least one OH group, and containing at least one blowing agent, characterized in that the foamable mixture has a dynamic viscosity of 100 to 25,000 mPas, preferably 500 to 10,000 mPas, at 23° C.

Foamable mixtures in the sense of the present invention are understood to be compositions containing crosslinkable polymers which undergo a volume expansion after application under the influence of gas released from a blowing agent and optionally also by chemical reactions and develop gas-filled cell structures. The foams are stabilized by the solidification of the substances being produced and optionally by added foam stabilizers. The foams formed from foamable mixtures are thus materials in the sense of the present invention, having open and/or closed cells distributed over their entire mass and having a lower bulk density than the structural substance.

Alkoxysilane-terminated prepolymers are understood to be polymeric compounds having a silyl group on at least one terminus, this silyl group in turn containing at least one alkoxy group, preferably two or three alkoxy groups. In the presence of atmospheric humidity, polymers having silyl groups with such hydrolyzable substituents can be condensed with one another even at room temperature while splitting off the hydrolyzed radicals. Depending on the amount of silyl groups having hydrolyzable substituents and the structure of these silyl groups, this results in the formation of mainly long-chain polymers (thermoplastics), relatively wide-meshed three-dimensional networks (elastomers) or highly crosslinked systems (thermoset plastics).

Hydroxy- or amino-functional alkoxysilanes are understood to be short-chain monomeric compounds having a terminal silyl group, which in turn contains at least one, preferably two or three alkoxy groups, which have at least one hydroxyl group or one primary or secondary amino group in terminal position within the structure constituting the compound or as substituents on this structure. However, this at least one hydroxyl group or primary or secondary amino group is not on the terminal silyl group. Both the hydroxyl group and the amino group have at least one mobile hydrogen atom and are reactive with carbonyl-active compounds, e.g., polymers having terminal isocyanate groups.

Isocyanato-functionalized alkoxysilanes are understood to be monomeric compounds having a terminal silyl group in the sense of the proceeding definition and also containing at least one terminal isocyanate function (—NCO). Alkoxysilane-terminated prepolymers can be obtained by reactions of polymers containing groups (e.g., hydroxyl groups or amino groups), which are reactive with isocyanate functions, with isocyanato-functionalized alkoxysilanes.

Blowing agents are understood to be blowing gases and substances which evolve blowing gases under the influence of heat or chemicals. In the narrower sense, this is understood to include gases which can be converted from the gaseous state to the liquid state, usually at low pressures and 20° C., i.e., so-called liquid gases.

Canned foam formulations contain blowing gases, which do not readily allow a determination of viscosity. To nevertheless determine the viscosity, those skilled in the art are aware of the fact that replacing the blowing gases with methylal and pentane leads to a pressureless foam formulation. The viscosity of the foamable mixtures according to the invention is therefore measured by replacing the blowing agent by a corresponding amount by weight of a mixture of 40 wt % methylal and 60 wt % pentane, i.e., an equal amount of methylal/pentane is added instead of the blowing agent. In the simplest case, this may be accomplished by the fact that, in the production of the mixture according to the invention, the actual blowing agent is not added to a portion of the mixture which is provided for the viscosity determination but instead the blowing agent is added directly to the methylal/pentane mixture. The dynamic viscosity of the foamable mixtures according to the invention is thus measured at 23° C. with replacement of the blowing agent by a methylal/pentane mixture in a 40:60 ratio. Thus, for example, in a formulation containing 21 wt % blowing agent, based on the total foamable mixture, the blowing gases of the canned foam formulation are replaced by a mixture of 8.4 wt % methylal and 12.6 wt % pentane. This formulation thus has the rheological ratios of a foam composition formulated with blowing agent, for example, DME/propane/butane. It has been observed that mixtures with a viscosity just below 25,000 mPas can still be applied moderately well, but mixtures with a viscosity below 10,000 mPas can be applied especially well. The viscosity is measured using the deformation-controlled ARES rotary rheometer from TA Instruments. The measurement is performed according to DIN 53018 for Newtonian mixtures or DIN 53019 for intrinsically viscous mixtures, each at 30 Hz. Cone-plate systems having a cone angle of 0.5° are used as the measurement systems. The cone angle may also be varied within a range of 0.5° to 3°. Alternatively, plate-plate systems with a gap between 200 mm and 800 mm may be used for systems which contain solids and have a higher viscosity. The viscosity values are determined at room temperature in a rotation test. After a resting time of 10 sec, the shear deformation is reached in linear increments from 0 sec$^{-1}$ to 100 sec$^{-1}$ within a period of 20 sec. The measurement is performed at 30 Hz.

An important advantage of the foamable mixtures according to the invention is that they predominantly have an intrinsic viscosity. An intrinsically viscous liquid is characterized in that it has a decreasing viscosity under the influence of increasing shear stress or shear rate. Accordingly, the respective mixtures according to the invention have a low viscosity in application—under high stress in the nozzle and/or through the narrower nozzle opening in discharge—and after application, when they are largely free of stress, they have a high viscosity, with the foam being further stabilized by the incipient curing process. Discharge from a pressurized can as well as the rapid development of a stable foam are thus greatly facilitated by the intrinsic viscosity of the respective mixtures according to the invention.

In a preferred embodiment of the foamable mixture according to the invention, the isocyanato-functionalized alkoxysilane is prepared from at least one di- or polyisocyanate and at least one amino- and/or hydroxy-functional alkoxysilane of formula (1)

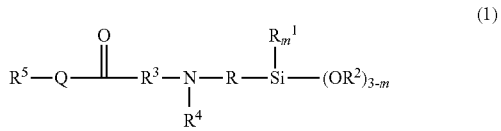

(1)

where m is 0, 1 or 2, R is a divalent organic group, $R^1$ is an alkyl radical with 1 to 8, preferably 1 to 4 carbon atoms, $R^2$ is an alkyl radical with 1 to 8, preferably 1 to 4 carbon atoms, $R^3$ is a covalent bond or an alkylene group with 1 to 6 carbon atoms, Q is an oxygen atom or a covalent bond, $R^4$ is a hydrogen atom, an alkyl or aryl radical with 1 to 10 carbon atoms, and $R^5$ is an alkyl or hydroxyalkyl group with 1 to 6 carbon atoms, such that for the case when $R^5$ is an alkyl group (i.e., $R^5$ in this case does not contain any OH group and is therefore not a hydroxyalkyl group), $R^4$ is a hydrogen atom.

R is especially preferably a difunctional, linear or branched alkylene radical with 2 to 6 carbon atoms, e.g., an ethylene, propylene, butylene, pentylene or hexylene radical or an isopropylene, isobutylene, isopentylene or isohexylene radical or a neopentylene radical.

$R^1$ and $R^2$ may be the same or different; these substituents may be, for example, a methyl, ethyl, n-propyl, isopropyl, n-butyl and/or isobutyl group. If $k^3$ is an alkylene group, it may be, or example, a methylene, ethylene, propylene, butylene, pentylene or hexylene group or an isopropylene, isobutylene, isopentylene or isohexylene group or a neopentylene group. $R^4$ stands for a hydrogen atom or an alkyl or aryl radical with 1 to 10 carbon atoms, for example, a methyl, ethyl, n-propyl, isopropyl, n-butyl, isobutyl, n-pentyl, isopentyl, neopentyl, n-hexyl, cyclohexyl radical or a phenyl or an anilino radical. $R^5$ is, for example, a methyl, ethyl, n-propyl, isopropyl, n-butyl, isobutyl, n-pentyl, isopentyl or n-hexyl group in which a hydrogen atom is optionally substituted by an OH group, especially preferably a terminal OH group.

In another preferred embodiment of the present invention, for the case when $R^3$ is a covalent bond, $R^5$ is a hydroxyalkyl group. In this case, corresponding hydroxy-functional alkoxysilanes is synthesizable by reaction of aminosilanes with alkylene carbonates or lactones. In another preferred embodiment, for the case when $R^3$ is an alkylene group, $R^4$ is a hydrogen atom. In this case, alkoxysilanes containing at least one secondary amino group are accessible by reaction of primary aminosilanes with acrylic acid esters. In any case, at least one functionality—either a hydroxyl group or an amino group—which is reactive with isocyanate groups is available. $R^5$ may then of course also have an OH group when $R^3$ is an alkylene group. Likewise $R^4$ may also be a hydrogen atom when $R^3$ is a covalent bond.

A hydroxy-functional alkoxysilane of formula (1) is preferably obtained by reacting an aminosilane having primary or secondary amino groups with a carbonate selected from ethylene carbonate, propylene carbonate, butylene carbonate, carbonates synthesized from 1,3-propanediol, 3,5-hexanediol, 3,5-heptanediol, 3,5-nonanediol or a lactone selected from propiolactone, butyrolactone or caprolactone. Alternatively, a hydroxy-functional alkoxysilane of formula (1) is a reaction product of a hydroxyalkyl methacrylate with an aminosilane.

The aminosilane may be selected from 3-aminopropyltrimethoxysilane, 3-aminopropyltriethoxysilane (for example, Dynasilan AMMO, Evonik or Geniosil GF 96, Wacker), N-(n-butyl)-3-aminopropyltrimethoxysilane, 3-amino-propylmethyldimethoxysilane, 3-aminopropylmethyldiethoxysilane, N-cyclohexylaminomethylmethyldiethoxysilane, N-cyclohexylaminomethyltriethoxysilane, N-phenylaminomethyltrimethoxysilane (e.g., Geniosil XL 973, Wacker), N-cyclohexyl-3-am inopropyltrimethoxysilane, 1-anilinomethyldimethoxymethylsilane (e.g., Geniosil XL972, Wacker), N-phenyl-3-aminopropyltrimethoxysilane (e.g., Y-9669, Momentive) or bis(3-triethoxyilylpropyl)amine (Silquest A-1170, GE).

Hydroxyalkyl(meth)acrylates may in principle be monoesters of acrylic acid or methacrylic acid with $C_2$ to $C_{20}$ diols. Especially preferred are hydroxyethyl acrylate, hydroxyethyl methacrylate 2-hydroxypropyl acrylate, 2-hydroxypropyl methacrylate, 3-hydroxypropyl acrylate, 3-hydroxypropyl methacrylate or 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate or 6-hydroxyhexyl methacrylate.

In another preferred embodiment of the foamable mixture according to the invention, m in formula (1) is 0 or 1. In general, polymers containing di- and/or trialkoxysilyl groups have highly reactive linkage sites, which enable rapid curing, high degrees of crosslinking and thus good final strength values. Another advantage of such polymers containing alkoxy groups may be seen in the fact that alcohols, which evaporate and are safe in the quantities released, are formed when cured under the influence of moisture. Therefore, such compositions are also suitable for the do-it-yourself field in particular. The special advantage of dialkoxysilyl groups is that the corresponding compositions are softer, more elastic and more flexible after curing than are systems containing trialkoxysilyl groups. They are therefore especially suitable for use as a foam sealant, for example. In addition, they split off less alcohol in curing and are therefore of particular interest when the amount of alcohol released is to be reduced.

With trialkoxysilyl groups, however, a higher degree of crosslinking can be achieved, which is advantageous in particular when a harder and more solid foam is desired after curing. In addition, trialkoxysilyl groups are more reactive, so they crosslink more rapidly and thus reduce the amount of catalyst optionally required and they offer advantages in "cold flow"—the dimensional stability of the cured composition under the influence of the application of force and optionally temperature.

According to the invention, the isocyanato-functionalized alkoxysilanes of component a) for synthesis of the alkoxysilane-terminated prepolymers is synthesizable from at least one hydroxy- and/or amino-functional alkoxysilane and at least one diisocyanate or polyisocyanate. In another preferred embodiment of the foamable mixture according to the invention, at least one diisocyanate is used in the production of the isocyanato-functionalized alkoxysilane(s). The diisocyanate is especially preferably used in a stoichiometric excess, based on the amino and/or OH groups of the hydroxy- or amino-functional alkoxysilane(s), where the NCO/OH and/or NCO/NH ratio is 1.5 to 3, preferably 1.8 to 2.2 and especially preferably approximately 2.

The following may be used as diisocyanates: ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and -1,4-diisocyante, bis(2-isocyanatoethyl) fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanate-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI) or isomer mixtures of TDI, 2,4'-diphenylmethane diisocyanate, 2,2'-diphenylmethane diisocyanate or 4,4'-diphenylmethane diisocyanate (MDI) as well as their isomer mixtures. In addition, partially or completely hydrogenated cycloalkyl derivatives of MDI, for example, completely hydrogenated MDI (H12-MDI), alkyl-substituted diphenylmethane diisocyanates, for example, mono-, di-, tri- or tetraalkyl diphenylmethane diisocyanates as well as their partially or completely hydrogenated cycloalkyl derivatives, 4,4'-diisocyanatophenyl perfluoroethane, phthalic acid bisisocyanatoethyl ester, 1-chloromethylphenyl 2,4- or -2,6-diisocyanate, 1-bromomethylphenyl 2,4- or -2,6-diisocyanate, 3,3-bis-chloromethyl ether 4,4'-diphenyl diisocyanate, sulfur-containing diisocyanates, such as those obtainable by reaction of 2 mol of diisocyanate with 1 mol thiodiglycol or dihydroxydihexyl sulfide, the diisocyanates of dimer fatty acids or mixtures of two or more of the aforementioned diisocyanates.

In another preferred embodiment of the foamable mixture according to the invention, the residual NCO content is less than 1. In particular the residual NCO content is less than 0.1 or the mixtures are free of isocyanate. According to the general understanding of those skilled in the art, the residual NCO content is understood to be the amount by weight of free NCO groups present in the foamable mixture, based on the total weight of the mixture. Within the scope of the present invention, the residual NCO content is defined by the stoichiometric ratio of the starting materials used, so this is a mathematical value. In calculating the residual NCO content, it is assumed that the NCO groups present in the starting materials and the groups which are reactive with NCO groups will react completely with one another. This has been confirmed by random sample tests—by titration according to standard methods.

Low amounts of isocyanate or isocyanate-free mixtures are preferred from a toxicological standpoint. On the other hand, a low residual NCO content has a positive effect in curing, in that the alcohols released by the hydrolysis of the alkoxysilyl groups are captured by the NCO groups. Due to this reaction, the remaining free, highly reactive isocyanate groups react to form toxicologically safe urethane groups, but also no unwanted side reactions, e.g., transesterifications, can be triggered by the alcohols that are released.

The isocyanato-functionalized alkoxysilane(s) of component a) preferably has (have) a dynamic viscosity of 50 to 500,000 mPas at 23° C., preferably 100 to 250,000 mPas, measured according to DIN/EN/ISO 2555. In addition, it is also possible according to the invention to use in component a) isocyanato-functionalized alkoxysilanes which have a viscosity higher than 500,000 mPas. To be able to bottle alkoxysilanes having an even higher viscosity, they are optionally mixed with at least one of the flame retardants listed below. The resulting mixture of isocyanato-functionalized alkoxysilane and flame retardant in turn preferably has a dynamic viscosity of 50 to 500,000 mPas, preferably 100 to 250,000 mPas, measured at 23° C. according to DIN/EN/ISO 2555.

According to the invention, at least one alkoxysilane-terminated prepolymer contained in the foamable mixture is synthesizable from at least one isocyanato-functionalized alkoxysilane and at least one compound containing at least one OH group. Within the scope of another especially preferred embodiment of the present invention, the at least one compound containing at least one OH group is a diol or polyol. However, this compound may also be a hydroxy- and/or amino-functional alkoxysilane of formula (1), such as that used in synthesis of the isocyanato-functionalized alkoxysilane of component a).

In principle, a plurality of polymers having at least two hydroxyl groups may be used as the diol or polyol compounds. Examples to be mentioned include polyester polyols, hydroxyl group-containing polycaprolactones, hydroxyl group-containing polybutadienes or polyisoprenes as well as their hydrogenation products or hydroxyl group-containing polyacrylates or polymethacrylates. The molecular weight range of the polyols should not be higher than 4000 for reasons of viscosity (of the prepolymer).

Especially preferred as polyols are polyalkylene glycols, in particular polyethylene glycols (PEG) and/or polypropylene glycols (PPG) with a molecular weight ($M_n$) between 400 and 2000. In another preferred embodiment of the foamable mixture according to the invention, at least one diol and/or triol having an average molecular weight $M_n$ of 400 to 2000 is used as the at least one compound containing at least one OH group, i.e., as component b). The molecular weight $M_n$ is understood to be the number-average molecular weight of the polymer. Like the weight-average molecular weight $M_w$, this can be determined by gel permeation chromatography (GPC, also SEC). Those skilled in the art are familiar with this method.

A foamable composition according to the invention contains at least one blowing agent in addition to at least one alkoxysilane-terminated prepolymer. In principle, a plurality of highly volatile hydrocarbons may be used as the blowing agent. The blowing agent is preferably selected from hydrocarbons and fluorohydrocarbons, each having 1 to 5 carbon atoms, and dimethyl ether (DME) as well as mixtures thereof. Propane, n-butane, isobutane, n-pentane, isopentane and DME as well as mixtures thereof are especially preferred, in particular propane, isobutane, n-butane and DME as well as mixtures thereof, e.g., a DME/propane/isobutane/n-butane mixture of 40 wt % DME with 60 wt % of a propane/isobutane/n-butane mixture in a 30/65/5 ratio (wt %). The blowing agents are used in amounts of 5 to 40 wt %, preferably 10 to 40 wt %, based on the total weight of the foamable mixture. The blowing agent content especially preferably amounts to 10 to 30 wt %, in particular 20 to 25 wt %, based on the total weight of the foamable mixture.

In a special embodiment, a foamable mixture according to the invention contains at least one liquid flame retardant.

The flame retardant is preferably selected from the group of halogenated (in particular brominated) ethers of the "Ixol" type from Solvay; brominated alcohols, in particular dibromoneopentyl alcohol, tribromoneopentyl alcohol and PHT-4-diol (1,2-benzenedicarboxylic acid, 3,4,5,6-tetrabromo-2-(2-hydroxyethoxy)ethyl-2-hydroxypropyl ester); organic phosphates, in particular diethylethane phosphonate (DEEP), triethyl phosphate (TEP), dimethyl propyl phosphonate (DMPP), diphenyl cresyl phosphate (DPC), as well as chlorinated phosphates (e.g., TMCP, Albemarle), in particular tris(2-chloroethyl)phosphate, tris(2-chloroisopropyl)phosphate (TCPP), tris(1,3-dichloroisopropyl)phosphate, tris(2,3-dibromopropyl)phosphate and tetrakis(2-chloroethyl)ethylene diphosphate and mixtures thereof.

Flame retardants are preferably present in the foamable mixture according to the invention in an amount of 1 to 65 wt %, especially preferably from 1 to 30 wt %, based on the total weight of the mixture. Amounts of 5 to 25 wt %, in particular 15 to 20 wt %, based on the total weight of the mixture, are especially preferred. It may be advantageous to select the flame retardants having hydroxyl groups from the aforementioned flame retardants at least proportionally because these are also incorporated into the polymeric foam structure.

According to another preferred embodiment of the foamable mixture according to the invention, it contains at least one catalyst. All the known compounds capable of catalyzing the hydrolytic cleavage of the bond between the silicon atom and the hydrolyzable groups of the silane termini as well as the subsequent condensation of the Si—OH group to siloxane groups (crosslinking reaction and/or adhesion promoter function) may be used as catalysts. Examples include titanates, such as tetrabutyl titanate and tetrapropyl titanate, tin(IV) catalysts, for example, tin carboxylates such as dibutyltin dilaurate (DBTL), dibutyltin diacetate, dibutyltin diethyl hexanoate, dibutyltin dioctoate, dibutyltin dimethyl maleate, dibutyltin diethyl maleate, dibutyltin dibutyl maleate, dibutyltin diisooctyl maleate, dibutyltin ditridecyl maleate, dibutyltin benzyl maleate, dibutyltin maleate, dibutyltin diacetate, tin octanoate, dioctyltin distealeate, dioctyltin dilaurate, dioctyltin diethyl maleate, dioctyltin diisooctyl maleate, dioctyltin diacetate and tin naphthenoate; tin alkoxides, such as dibutyltin dimethoxide, dibutyltin diphenoxide and dibutyltin diisoproxide; tin oxides, such as dibutyltin oxide and dioctyltin oxide; reaction products between dibutyltin oxides and phthalic acid esters, dibutyltin bisacetylacetonate; organoaluminum compounds, such as aluminum trisacetylacetonate, aluminum trisethylacetoacetate and diisopropoxyaluminum ethylacetoacetate; chelate compounds such as zirconium tetraacetylacetonate and titanium tetraacetylacetonate; lead octanoate; amine compounds or their salts with carboxylic acids, such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undec-7-ene (DBU), a low-molecular polyamide resin obtained from an excess of a polyamine and a polybasic acid, adducts of a polyamine in excess with an epoxide, silane adhesion promoters with amino groups, such as 3-aminopropyltrimethoxysilane and N-(β-aminoethyl)aminopropylmethyldimethoxysilane.

Most especially preferred catalysts include titanium (diisopropoxide) bis(acetylacetonate) (TAA), titanium(IV) oxide acetylacetonate, aluminum acetylacetonate, 1,4-diazabicyclo[2.2.2]octane, N,N-dimethylpiperazine, 1,8-diazabicyclo[5.4.0]-undec-7-ene, dimorpholinodimethyl ether, dimorpholinodiethyl ether (DMDEE) or mixtures thereof. A foamable mixture according to the invention especially preferably contains a catalyst selected from tin(IV) catalysts, titanium (diisopropoxide) bis(acetylacetonate) (TAA), titanium(IV) oxide acetylacetonate, aluminum acetylacetonate, 1,4-diazabicyclo[2.2.2]octane, N,N-dimethylpiperazine, 1,8-diazabicyclo[5.4.0]undec-7ene, dimorpholinodimethyl ether, dimorpholinodiethyl ether (DMDEE) and mixtures thereof. The catalyst, preferably mixtures of several catalysts, is/are preferably used in an amount of 0.01 to approximately 5 wt %, based on the total weight of the foamable mixture and/or preparation.

In addition, a foamable mixture according to the invention may contain the usual additives and auxiliary substances. These include in particular foam stabilizers in quantity ranges between 0.1 and 5 wt %, based on the total weight of the foamable mixture.

A foamable mixture according to the invention may also contain a reactive diluent. A reactive diluent is understood to be a component which reduces the viscosity of the as yet uncured composition, but is incorporated into the crosslinking by chemical reaction during curing. For example, the following substances may be used as reactive diluents: polyalkylene glycols reacted with isocyanato-functional alkoxysilanes (e.g., Synalox 100-50B, DOW), carbamatopropyltrimethoxysilane, alkyltrimethoxysilanes or alkyltriethoxysilanes, such as methyltrimethoxysilane or methyltriethoxysilane; furthermore, vinyltrimethoxysilane (VTMO, Geniosil XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (10 Triethoxy, Wacker), N-trimethoxysilylmethyl-O-methyl carbamate (XL63, Wacker), N-dimethoxy(methyl)-silylmethyl-O-methyl carbamate (XL65, Wacker), hexadecyltrimethoxysilane, 3-octanoylthio-1-propyltriethoxysilane and partial hydrolyzates of these compounds. Especially preferred is at least one reactive diluent selected from methyl-, vinyl- and phenyltrimethoxysilane and/or their partial hydrolyzates as well as mixtures thereof. The reactive diluent(s) is (are) preferably present in concentrations >1 wt % to 20 wt %, especially preferably between 1.5 wt % and 5 wt %, based on the weight of the alkoxysilane-terminated prepolymer.

Another subject matter of the present invention relates to a method for synthesis of a foamable mixture according to the invention, which is characterized in that i) at least one alkoxysilane-terminated prepolymer, which is synthesizable from
a) at least one isocyanato-functionalized alkoxysilane, which is synthesizable from at least one hydroxy- and/or amino-functional alkoxysilane and at least one diisocyanate or polyisocyanate, and
b) at least one compound containing at least one OH group, is mixed with at least one blowing agent, and optionally flame retardant(s) and filled into disposable pressurized containers (aerosol cans); or ii) at least one mixture, which contains at least one isocyanato-functionalized alkoxysilane that is synthesizable from at least one hydroxy- and/or amino-functional alkoxysilane and at least one diisocyanate or polyisocyanate and at least one compound containing at least one OH group as well as at least one blowing agent, and optionally flame retardant(s), is filled into disposable pressurized containers (aerosol cans).

In this method, which comprises essentially filling disposable pressurized containers (aerosol cans) with a foamable mixture according to the invention, thus either the alkoxysilane-terminated prepolymer(s) or components a) and b) required to produce the prepolymer(s) together with blowing agents, optionally flame retardant(s) and optionally additional auxiliary substances is/are filled into the pressurized container. Such filling processes cannot readily be performed because of the high viscosity of the alkoxysilane-terminated prepolymers. A known method for overcoming these difficulties consists of heating the prepolymers so that their viscosity drops to the extent that they an be filled into the containers. However, this method entails risks with regard to the thermal stability of the components. Two alternative methods are proposed within the scope of the present invention. If the alkoxysilane-terminated prepolymers that have already been synthesized are to be filled, then corresponding amounts of blowing agents and optionally flame retardant(s) are added to reduce their viscosity to the extent that they can be filled into the pressurized containers with no problem. In another preferred method for producing the foamable mixtures according to the invention, the prepolymer is produced in disposable pressurized containers (aerosol cans) in mixture with blowing agents and optionally flame retardant(s). The components apparently react in the pressurized container to form an alkoxysilane-terminated prepolymer that is largely identical to a prepolymer obtained by controlled graduated reaction outside of the container when the same or corresponding precursors are used. This method in which only the starting materials are bottled reveals great advantages in application due to the low viscosities of these components. The foamable mixture itself takes is prepared directly in the retail container, the disposable pressurized container (aerosol can). The isocyanato-functional alkoxysilanes obtainable from diisocyanates and hydroxy- and/or amino-functional alkoxysilanes are suitable in particular for this procedure.

In a preferred embodiment of the method according to the invention, at least one mixture containing at least one isocyanato-functionalized alkoxysilane, which is synthesizable from at least one hydroxy- and/or amino-functional alkoxysilane and at least one di- or polyisocyanate and at least one compound containing at least one OH group as well as at least one blowing agent and optionally flame retardant(s) is filled into disposable pressurized containers (aerosol cans), and after being filled, the temperature of the mixture in the disposable pressurized container reaches levels of 50° C. to 100° C., preferably 50° C. to 70° C., without any external influence. This jump in temperature, which is induced without external influence, i.e., without additional heating or any other influence, can be measured. This is extremely advantageous because with this method, in addition to simplified filling using low-viscosity components, the stability of the pressurized container can be verified at the same time. This method is therefore suitable for replacing the traditional water bath test for stability of the pressurized container, which is specified in the relevant hazardous goods regulations and can thus save the user the associated expense.

Another subject matter of the present invention is a disposable pressurized container containing a foamable mixture according to the invention or a foamable mixture prepared by a method according to the invention. The disposable pressurized container (aerosol can) thus contains at least one alkoxysilane-terminated prepolymer synthesizable from a) at least one isocyanato-functionalized alkoxysilane synthesizable from at least one hydroxy- and/or amino-functional alkoxysilane and at least one di- or polyisocyanate and
b) at least one compound containing at least one OH group; and containing at least one blowing agent. To enable good processability of the mixture—especially filling the container—the viscosity of the mixture according to the invention is 100 to 25,000 mPas, preferably 500 to 10,000 mPas.

The foamable mixtures according to the invention cure by reacting with ambient atmospheric humidity after being discharged from the aerosol can, forming fine-celled foams, so that the foamable mixtures are suitable for sealing, insulating and/or mounting joints, for example, roof surfaces, windows and doors or for filling cavities.

Another subject matter of the present invention is therefore also the use of a foamable mixture according to the invention or a mixture prepared by a method according to the invention for sealing, insulating and/or mounting joints, roof surfaces, windows and doors or for filling cavities.

Another subject matter of the present invention is the use of a mixture containing at least one alkoxysilane-terminated prepolymer which can be prepared from
a) at least one isocyanato-functionalized alkoxysilane synthesizable from at least one hydroxy- and/or amino-functional alkoxysilane and at least one di- or polyisocyanate and
b) at least one compound containing at least one OH group;
and at least one blowing agent as a foamable mixture. The definitions and/or embodiments of the objects and/or compounds designated with the terms used above, such as "alkoxysilane-terminated prepolymer," "isocyanato-functionalized alkoxysilane," "hydroxy- and/or amino-functional alkoxysilane," "di- or polyisocyanate," "compound containing at least one OH group," "blowing agent" and "foamable mixture" are identical to the definitions and/or embodiments explained within the context of the preceding text.

Essentially all embodiments, proportional ranges, components and other features of the foamable mixture according to the invention, listed as preferred within the context of the present text, the disposable pressurized container according to the invention and applications according to the invention may be implemented in all possible combinations that are not mutually exclusive.

The invention will be explained in greater detail in the following exemplary embodiments, where the selection of examples should not constitute a restriction of the scope of the subject matters according to the invention.

EXAMPLES

Production of Preproducts and Prepolymers:

Example 1

In a stirred flask, 138 g propylene carbonate and 220 g 3-aminopropyl-trimethoxysilane (Dynasilan AMO, Evonik) were stirred for 12 hours at room temperature. A sample examined in an IR spectrometer revealed that the propylene carbonate had reacted fully and indicated further processing.

Example 2

144 g hydroxypropyl methacrylate was placed in a stirred flask, and 211 g 1-anilinomethyldimethoxymethylsilane (Geniosil XL972 Wacker) was added slowly by drops. Stirring was continued at room temperature. A sample examined in the IR spectrometer showed a complete reaction of the Michael reaction product and indicated further processing.

Example 3

96 g TDI-100 was placed in a stirred flask and within 1 hour 155 g of the reaction product of propylene carbonate with aminosilane from example 1 was added by drops so that the temperature remained below 40° C. The resulting polymer was cooled and mixed with 6 g vinyltrimethoxysilane. The viscosity of the resulting isocyanato-functional alkoxysilane was 25,000 mPas at room temperature (23° C.).

Example 4

70 g MDI-50 and 25 g TMCP were placed in a stirred flask. Next 80 g of the reaction product of propylene carbonate with aminosilane from example 1 was added by drops within 1 hour, so that the temperature remained below 40° C. The resulting polymer was cooled and mixed with 6 g vinyltrimethoxysilane. The viscosity of the resulting isocyanato-functional alkoxysilane was 95,000 mPas at room temperature (23° C.).

Example 5

417 g crude MDI (Desmodur 44 V20) and 160 g TMCP were placed in a stirred flask. Next 375 g of the reaction product of propylene carbonate with the aminosilane from example 1 was added by drops within 2 hours, so that the temperature remained below 50° C. The resulting polymer was cooled and mixed with 6 g vinyltrimethoxysilane. The viscosity of the resulting isocyanato-functional alkoxysilane was 325,000 mPas at room temperature (23° C.).

Example 6

130 g (20 mmol) TDI-100 and 1.3 g benzoyl chloride were placed in the reactor and then 170 g (10 mmol) PPG 400 was added by drops. After reaching the theoretical NCO value, the hydroxysilane from example 1 was added slowly. The resulting prepolymer had a viscosity of 800 Pas at 23° C.

Example 7

24.2 g PPG 400 was mixed with 51.6 g of the addition product of example 3 and agitated, which resulted in a moderate release of heat. The resulting prepolymer had a viscosity of 900 Pas at 23° C.

Example 8 (comparison)

199 g (10 mmol) polypropylene glycol with a molecular weight ($M_n$) of 400 g/mol was placed in the reactor together with 151 g (20 mmol) TDI as the diisocyanate and reacted to form the NCO-terminated prepolymer at 80° C. with tin/bismuth catalysis (Borchikat 22/24). The reaction was performed with NCO monitoring; as soon as the theoretical NCO level of the prepolymer was reached (titrimetric), 60 g of aminosilane XL 972 was added, whereupon the temperature rose and the viscosity increased massively. After adding 2% vinyl-trimethoxysilane, the product was bottled and sealed watertight. The viscosity at 23° C. was outside of the measurement range and was thus far above 2000 Pas.

Production of Foamable Mixtures

The isocyanato-functional alkoxysilane of example 3 was bottled in an aerosol can together with polyol, blowing agent (mixture of DME and propane/butane), flame retardant, catalyst, reactive diluent and foam stabilizer. The can was sealed with a valve and the contents were mixed thoroughly by shaking. The actual prepolymer synthesis thus took place in the aerosol can. Additional foamable mixtures according to the invention were prepared similarly from the isocyanato-functional alkoxysilanes of examples 4 and 5. Stepanpol PD 19OLV, among others, from the company Stepan was also used as the polyol.

The viscosity of the foamable mixtures was measured as explained above by replacing the blowing agent with a mixture of 8.4% methylal and 12.6% pentane (M/P mixture).

After the conventional application of the foamable mixture, the foam cured in ambient atmospheric humidity and its properties were evaluated.

The results are summarized in the following table (quantitative amounts in wt %). These data show clearly that the foamable mixtures according to the invention cure rapidly to form foams having good properties.

The viscosity of the prepolymer of example 8 was too high to allow it to be bottled at room temperature or with moderate heating in conventional aerosol cans.

TABLE

| Example | 9 | 10 | 10a | 10b | 10c | 10d | 11 | 12 | 13 | 14 |
|---|---|---|---|---|---|---|---|---|---|---|
| Isocyanato-functionalized alkoxysilane Example 3 | 46.3 | 42.7 | 42.4 | 32.87 | 44.94 | 33.51 | | | | |
| Isocyanato-functionalized alkoxysilane Example 4 | | | | | | | 52.4 | 49.2 | | |
| Isocyanato-functionalized alkoxysilane Example 5 | | | | | | | | | 45 | 45 |
| PPG 400/Voranol CP 450 1:1 | 15.4 | | | | | | 16.1 | | | |
| PHT4-diol/Stepanpol PD 190LV 1:1 | | 16.4 | 24.4 | 18.9 | 25.8 | 19.2 | | 19.4 | | 4.5 |
| Addition product Example 1 | | | | | | | | | 22.7 | 17.8 |
| TMCP | 15.00 | 16.5 | 10 | 25 | 15 | 15 | 7.8 | 8.4 | 9 | 9 |
| DBU | 0.50 | 0.50 | 0.50 | 0.50 | 0.50 | 0.50 | 0.50 | 0.50 | 0.50 | 0.05 |
| TAA | 0.25 | 0.25 | 0.25 | 0.25 | 0.25 | 0.25 | 0.25 | 0.25 | 0.25 | 0.25 |
| Tegostab B 8465 | 1.25 | 1.25 | 1.25 | 1.25 | 1.25 | 1.25 | 1.25 | 1.25 | 1.25 | 1.25 |
| DME-P/B (40:60) | 21.00 | 21.00 | 21 | 21 | 10 | 30 | 21.00 | 21.00 | 21.00 | 21.00 |
| Viscosity as M/P mixture in mPas | 1000 | 1500 | 7000 | 2500 | 4800 | 3000 | 3000 | 4000 | 6000 | 8000 |
| Type of preparation | SV | SV | SV | N | SV | N | SV | SV | SV | SV |
| SV: intrinsic viscosity | | | | | | | | | | |
| N: Newtonian | | | | | | | | | | |
| Foam evaluation | | | | | | | | | | |
| Foam structure (fresh) | 1 | 1 | 1 | 1 | 1 | 1 | 1 | 1 | 1 | 1 |
| Foam structure (cured) | 1 | 2 | 1 | 2 | 1 | 2 | 1 | 2 | 1 | 2 |
| Foam volume | good | good | satisfactory | poor | adequate | high | good | good | Good | good |
| Formation of skin (minutes) | 10 | 12 | 12 | 12 | 11 | 10 | 10 | 13 | 11 | 12 |
| Cuttable (minutes) | 120 | 150 | 150 | 150 | 120 | 120 | 120 | 140 | 120 | 150 |
| Shrinkage | none | slight | none | slight | none | slight | none | slight | None | slight |

Evaluation of the foam structure
1 very fine-celled
2 fine-celled
Foam volume:
satisfactory = satisfactory
adequate = adequate
TMCP-tris(2-chloroisopropyl) phosphate
DBU-1,8-diazabicyclo[5.4.0]undec-7-ene
TTA-titanium (diisopropoxide) bis(acetylacetonate)
Tegostab B 8465-polyether-modified polysiloxane

The invention claimed is:

1. A foamable mixture, comprising
at least one alkoxysilane-terminated prepolymer, synthesized from
   a) at least one isocyanato-functionalized alkoxysilane, synthesized from at least one hydroxy- and/or amino-functional alkoxysilane and at least one di- or polyisocyanate, and
   b) at least one diol or triol or polyol with an average molecular weight $M_n$ of 400 to 2000; and
at least one blowing agent,
wherein the foamable mixture has a dynamic viscosity of 100 to 25,000 mPas at 23° C. (measured using an ARES rotational rheometer, after replacing the blowing agent with a methylal/pentane mixture of the same weight in a weight ratio of 40:60; 30 Hz;
cone-plate (cone angle))0.5°.

2. The foamable mixture according to claim 1, wherein the isocyanato-functionalized alkoxysilane is synthesized from at least one di- or polyisocyanate and at least one amino- and/or hydroxy-functional alkoxysilane of formula (I)

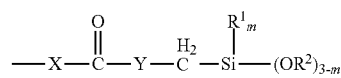

wherein m is 0, 1 or 2, R is a divalent organic group, $R^1$ is an alkyl radical with 1 to 8 carbon atoms, $R^2$ is an alkyl radical with 1 to 8 carbon atoms, $R^3$ is a covalent bond or an alkylene group with one to six carbon atoms, Q is an oxygen atom or a covalent bond, $R^4$ is a hydrogen atom, or an alkyl or aryl radical with 1 to 10 carbon atoms, and $R^5$ is an alkyl or hydroxyalkyl group with one to six carbon atoms, wherein $R^4$ is a hydrogen atom for the case when $R^5$ is an alkyl group.

3. The foamable mixture according to claim 2, wherein $R^5$ is a hydroxyalkyl group for the case when $R^3$ is a covalent bond.

4. The foamable mixture according to claim 2, wherein m is zero or one.

5. The foamable mixture according to claim 1, wherein the residual NCO content is less than 1.

6. The foamable mixture according to claim 1, wherein it contains at least one reactive diluent, selected from methyl-, vinyl- and phenyltrimethoxysilane and/or their partial hydrolysates as well as mixtures thereof.

7. The foamable mixture according to claim 1, wherein it contains blowing agent in an amount of 10 to 30 wt %, based on the total weight of the mixture.

8. The foamable mixture according to claim 1, wherein the blowing agent is selected from hydrocarbons and fluorinated hydrocarbons, each having one to five carbon atoms, and dimethyl ether as well as mixtures thereof.

9. The foamable mixture according to claim 1, wherein it contains at least one liquid flame retardant, which is selected from the following group: brominated ethers; brominated alcohols, dibromoneopentyl alcohol, tribromoneopentyl alcohol and PHT-4-diol; organic phosphates, diethylethane phosphonate (DEEP), triethyl phosphate (TEP), dimethyl propyl phosphonate (DMPP), diphenyl cresyl phosphate (DPC), chlorinated phosphates, tris(2-chloroethyl) phosphate, tris(2-chloroisopropyl) phosphate (TCPP), tris(1,3-dichloroisopropyl) phosphate, tris(2,3-dibromopropyl) phosphate and tetrakis(2-chloroethyl)ethylene diphosphate and mixtures thereof.

10. The foamable mixture according to claim 1, wherein it contains flame retardants in an amount of 1 to 30 wt %, based on the total weight of the mixture.

11. The foamable mixture according to claim 1, wherein the foamable mixture contains at least one catalyst selected from tin(IV) catalysts, titanium (diisopropoxide) bis(acetylacetonate) (TAA), titanium (IV) oxide acetylacetonate, aluminum acetylacetonate, 1,4-diazabicyclo-[2.2.2]octane, N,N-dimethylpiperazine, 1,8-diazabicyclo [5.4.0]undec-7-ene, dimorpholinodimethyl ether, dimorpholinodiethyl ether (DMDEE) and mixtures thereof.

12. A disposable pressurized container containing a foamable mixture according to claim 1.

13. A method of sealing, insulating and/or installing joints, roofing, windows or doors or for filling cavities comprising dispensing a foamable mixture according to claim 1 from a pressurized container.

\* \* \* \* \*